US012603417B2

(12) United States Patent
Wu et al.

(10) Patent No.: US 12,603,417 B2
(45) Date of Patent: Apr. 14, 2026

(54) WEARABLE DEVICE AND COMMUNICATION METHOD

(71) Applicant: HTC Corporation, Taoyuan City (TW)

(72) Inventors: Chun-Yih Wu, Taoyuan City (TW); Ta-Chun Pu, Taoyuan City (TW); Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 70 days.

(21) Appl. No.: 18/917,097

(22) Filed: Oct. 16, 2024

(65) Prior Publication Data

US 2026/0081345 A1 Mar. 19, 2026

(30) Foreign Application Priority Data

Sep. 13, 2024 (TW) ................................ 113134764

(51) Int. Cl.
*H01Q 1/27* (2006.01)
*F41H 1/02* (2006.01)
*F41H 3/02* (2006.01)
*H01Q 1/38* (2006.01)

(52) U.S. Cl.
CPC .............. *H01Q 1/273* (2013.01); *F41H 1/02* (2013.01); *F41H 3/02* (2013.01); *H01Q 1/38* (2013.01)

(58) Field of Classification Search
CPC .. H01Q 1/273; H01Q 1/38; F41H 1/02; F41H 3/02
See application file for complete search history.

(56) References Cited

U.S. PATENT DOCUMENTS

2022/0294100 A1* 9/2022 Zhang ................ H01Q 15/0066
2025/0316919 A1* 10/2025 Lilja .................... H01R 13/646

* cited by examiner

*Primary Examiner* — David E Lotter
(74) *Attorney, Agent, or Firm* — Birch, Stewart, Kolasch & Birch, LLP

(57) ABSTRACT

A wearable device includes a flexible wearable layer and a detachable layer. The flexible wearable layer includes a fabric element and a first metal resonant structure. The first metal resonant structure is integrated with the fabric element. The detachable layer is adjacent to the flexible wearable layer. The detachable layer includes a dielectric substrate and a second metal resonant structure. The dielectric substrate has a first surface and a second surface which are opposite to each other. The second metal resonant structure is distributed over the first surface and the second surface of the dielectric substrate. When the wearable device receives an RF (Radio Frequency) signal, the flexible wearable layer guides the RF signal to the detachable layer.

20 Claims, 5 Drawing Sheets

231

232

233

WEARABLE DEVICE AND COMMUNICATION METHOD

CROSS REFERENCE TO RELATED APPLICATIONS

This application claims priority of Taiwan Patent Application No. 113134764 filed on Sep. 13, 2024, the entirety of which is incorporated by reference herein.

BACKGROUND OF THE INVENTION

Field of the Invention

The invention relates to a wearable device, and more particularly, to a wearable device and a communication method.

Description of the Related Art

In the field of wireless communication, non-ideal signal reflections can often degrade relative communication quality, and even result in leakage of positioning information and other problems. Accordingly, there is a need to propose a novel solution for solving this problem of the prior art.

BRIEF SUMMARY OF THE INVENTION

In an exemplary embodiment, the invention is directed to a wearable device that includes a flexible wearable layer and a detachable layer. The flexible wearable layer includes a fabric element and a first metal resonant structure. The first metal resonant structure is integrated with the fabric element. The detachable layer is adjacent to the flexible wearable layer. The detachable layer includes a dielectric substrate and a second metal resonant structure. The dielectric substrate has a first surface and a second surface which are opposite to each other. The second metal resonant structure is distributed over the first surface and the second surface of the dielectric substrate. When the wearable device receives an RF (Radio Frequency) signal, the flexible wearable layer guides the RF signal to the detachable layer.

In some embodiments, the flexible wearable layer causes a Mie scattering event of the RF signal. The main transmission direction of the Mie scattering event is toward the detachable layer.

In some embodiments, the wearable device covers an operational frequency band from 2.4 GHz to 100 GHz. The frequency of the RF signal is within the operational frequency band.

In some embodiments, the first metal resonant structure includes a plurality of first metal units distributed over the fabric element. The first metal units are independent of each other.

In some embodiments, the length of each first metal unit is from 0.1 to 1 wavelength of the operational frequency band.

In some embodiments, the distance between any two adjacent first metal units is shorter than or equal to 0.1 wavelength of the operational frequency band. Thus, a specific capacitance is formed between any two adjacent first metal units.

In some embodiments, the distance between the flexible wearable layer and the detachable layer is shorter than or equal to 0.5 wavelength of the operational frequency band.

In some embodiments, the second metal resonant structure includes a plurality of second metal units disposed on the first surface and the second surface of the dielectric substrate. The second metal units are independent of each other.

In some embodiments, the second metal units are inductive elements.

In some embodiments, the length of each second metal unit is shorter than or equal to 0.5 wavelength of the operational frequency band.

In some embodiments, the distance between any two adjacent second metal units is shorter than or equal to 0.1 wavelength of the operational frequency band. Thus, a specific capacitance is formed between any two adjacent second metal units.

In some embodiments, the dielectric substrate is implemented with a bulletproof plate, which may be made of Kevlar synthetic fibers.

In another exemplary embodiment, the invention is directed to a communication method that includes the steps of: providing a flexible wearable layer, wherein the flexible wearable layer includes a fabric element and a first metal resonant structure, and the first metal resonant structure is integrated with the fabric element; providing a detachable layer adjacent to the flexible wearable layer, wherein the detachable layer includes a dielectric substrate and a second metal resonant structure, the dielectric substrate has a first surface and a second surface opposite to each other, and the second metal resonant structure is distributed over the first surface and the second surface of the dielectric substrate; and when an RF signal is received, guiding the RF signal to the detachable layer by the flexible wearable layer.

In some embodiments, the communication method further includes: causing a Mie scattering event of the RF signal by the flexible wearable layer. The main transmission direction of the Mie scattering event is toward the detachable layer.

In some embodiments, the frequency of the RF signal is within an operational frequency band from 2.4 GHz to 100 GHz.

In some embodiments, the length of each of a plurality of first metal units of the first metal resonant structure is from 0.1 to 1 wavelength of the operational frequency band.

In some embodiments, the distance between any two adjacent first metal units of the first metal resonant structure is shorter than or equal to 0.1 wavelength of the operational frequency band. Thus, a specific capacitance is formed between any two adjacent first metal units.

In some embodiments, the length of each of a plurality of second metal units of the second metal resonant structure is shorter than or equal to 0.5 wavelength of the operational frequency band.

In some embodiments, the distance between any two adjacent second metal units of the second metal resonant structure is shorter than or equal to 0.1 wavelength of the operational frequency band. Thus, a specific capacitance is formed between any two adjacent second metal units.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
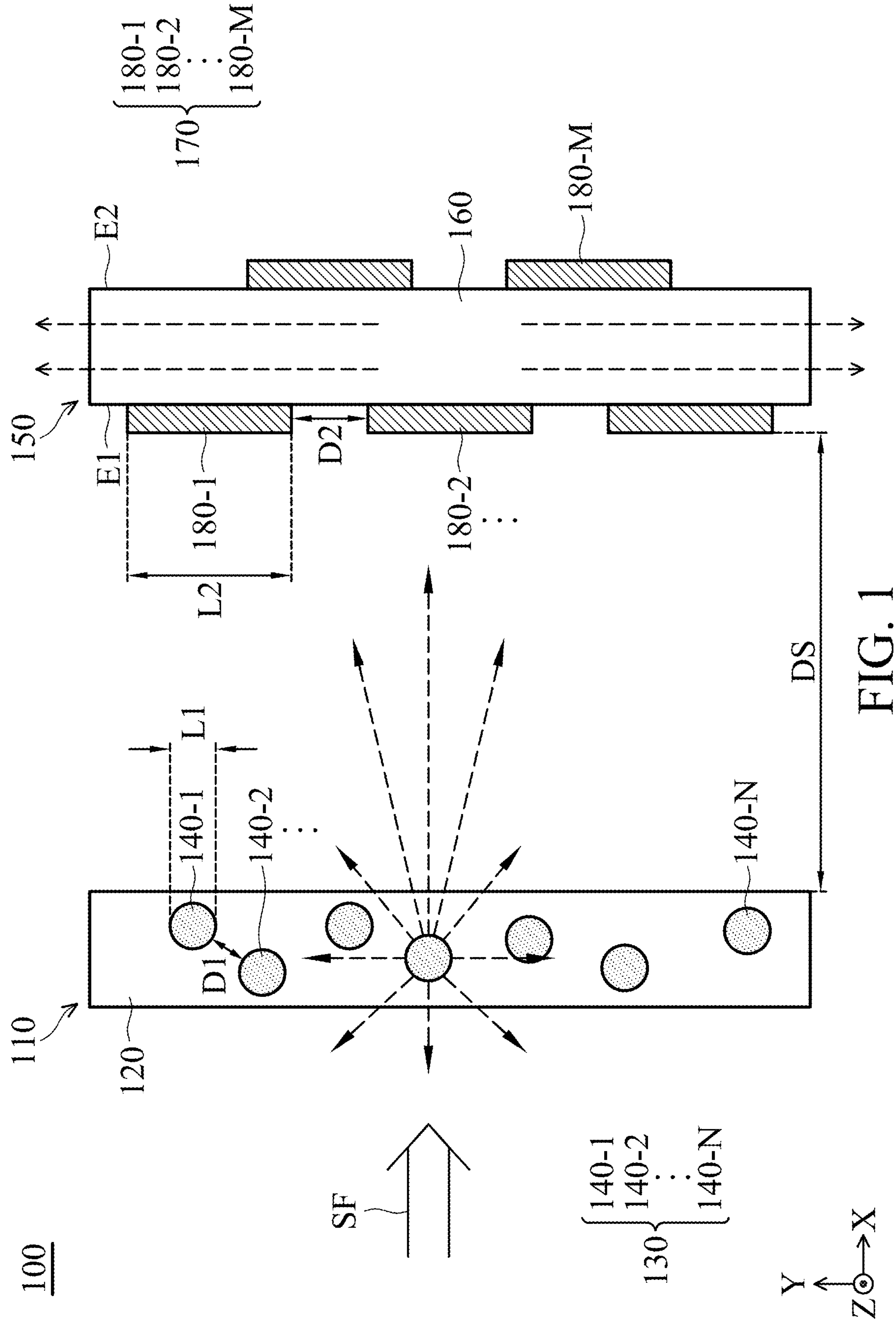
FIG. 1 is a sectional view of a wearable device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a sectional view of a wearable device 100 according to an embodiment of the invention. For example, the wearable device 100 may be clothing for specific purposes, such as a suit of anti-detection clothes. Alternatively, the wearable device 100 may be applied to relative equipment of VR (Virtual Reality) or AR (Augmented Reality). As shown in FIG. 1, the wearable device 100 at least includes a flexible wearable layer 110 and a detachable layer 150. For example, when the wearable device 100 is not used for suppressing signal reflections, the detachable layer 150 may be easily removed from the wearable device 100, so as to maintain its wearing comfort. It should be understood that the wearable device 100 may include other components, such as a zipper element or a drawstring element, although they are not displayed in FIG. 1.

The flexible wearable layer 110 includes a fabric element 120 and a first metal resonant structure 130. The first metal resonant structure 130 is integrated with the fabric element 120. The type and style of the fabric element 120 are not limited in the invention. For example, the fabric element 120 may be any portion of clothing or a pant. In some embodiments, the first metal resonant structure 130 includes a plurality of first metal units 140-1, 140-2, . . . , and 140-N distributed over the fabric element 120, where "N" is any integer greater than or equal to 10. For example, the first metal units 140-1, 140-2, . . . , and 140-N may be independent of each other, and they may be completely separate from each other. It should be understood that the distribution of the first metal units 140-1, 140-2, . . . , and 140-N of the first metal resonant structure 130 may be uniform or non-uniform on the fabric element 120. In alternatively embodiments, the first metal resonant structure 130 is embedded in the fabric element 120, or is interleaved with the fabric element 120.

The detachable layer 150 is adjacent to the flexible wearable layer 110. Specifically, the detachable layer 150 includes a dielectric substrate 160 and a second metal resonant structure 170. The dielectric substrate 160 has a first surface E1 and a second surface E2 which are opposite to each other. The second metal resonant structure 170 is distributed over the first surface E1 and the second surface E2 of the dielectric substrate 160. In some embodiments, the second metal resonant structure 170 includes a plurality of second metal units 180-1, 180-2, . . . , and 180-M disposed on both of the first surface E1 and the second surface E2 of the dielectric substrate 160, where "M" is any integer greater than or equal to 2. For example, the second metal units 180-1, 180-2, . . . , and 180-M may be independent of each other, and they may be completely separate from each other. It should be understood that the distribution of the second metal units 180-1, 180-2, . . . , and 180-M of the second metal resonant structure 170 may be uniform or non-uniform on the dielectric substrate 160. In some embodiments, the dielectric substrate 160 is implemented with a bulletproof plate, so as to enhance the functions of safety protection for the wearable device 100. It should also be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

In a preferred embodiment, when the wearable device 100 receives an RF (Radio Frequency) signal SF (e.g., it may be from the direction of +X-axis), the flexible wearable layer 110 can guide the RF signal SF to the detachable layer 150. For example, the RF signal SF may be a Bluetooth signal or a Wi-Fi signal, but it is not limited thereto. Next, the detachable layer 150 can transmit the RF signal SF in the directions which are parallel to the dielectric substrate 160 (it may be parallel to the directions of +Y-axis and −Y-axis, as indicated by the dashed arrows in FIG. 1). With such a design, the non-ideal reflection of the RF signal SF with respect to the wearable device 100 can be significantly reduced, such that the wearable device 100 may not be easily detected by an external radar (not shown).

In some embodiments, the wearable device 100 covers an operational frequency band from 2.4 GHz to 100 GHz, and the frequency of the RF signal SF falls within the operational frequency band. Accordingly, the wearable device 100 can support the wideband operation of RF wireless communication.

In some embodiments, the flexible wearable layer 110 causes a Mie scattering event of the RF signal SF. The main transmission direction of the Mie scattering event may be toward the detachable layer 150. In other words, the radiation energy of the RF signal SF can be mainly transmitted to the detachable layer 150 (e.g., along the direction of +X-axis) by using the flexible wearable layer 110. Only a very small portion of the radiation energy of the RF signal SF may be reflected back (e.g., along the direction of −X-axis).

In some embodiments, the element sizes and element parameters of the wearable device 100 will be described as follows. The distance DS between the flexible wearable layer 110 and the detachable layer 150 may be shorter than or equal to 0.5 wavelength (λ/2) of the operational frequency band of the wearable device 100. In the first metal resonant structure 130, the length L1 of each of the first metal units 140-1, 140-2, . . . , and 140-N may be from 0.1 to 1 wavelength (λ/10~λ) of the operational frequency band of the wearable device 100. Furthermore, the distance D1 between any adjacent two of the first metal units 140-1, 140-2, . . . , and 140-N may be shorter than or equal to 0.1 wavelength (λ/10) of the operational frequency band of the wearable device 100, such that there can be a specific capacitance formed between any adjacent two first metal units. The dielectric constant of the dielectric substrate 160 may be from 2 to 10, such as about 6 or 8. In the second metal resonant structure 170, the length L2 of each of the second metal units 180-1, 180-2, . . . , and 180-M may be shorter than or equal to 0.5 wavelength (λ/2) of the operational frequency band of the wearable device 100. Furthermore, the distance D2 between any adjacent two of the second metal units 180-1, 180-2, . . . , and 180-M may be shorter than or equal to 0.1 wavelength (λ/10) of the operational frequency band of the wearable device 100, such that there can be another specific capacitance formed between any adjacent two second metal units. The above ranges of element sizes and element parameters are calculated and obtained according to many experimental results, and they help to optimize the wearable device 100's capability of suppressing reflections.

The following embodiments will introduce different configurations and detail structural features of the wearable device 100. It should be understood that these figures and descriptions are merely exemplary, rather than limitations of the invention.

Figure 2A:
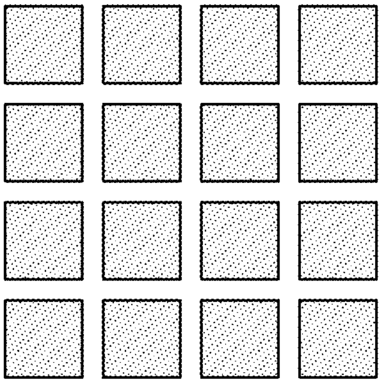
FIG. 2A is a top view of a first metal resonant structure according to an embodiment of the invention.

FIG. 2A is a top view of a first metal resonant structure 231 according to an embodiment of the invention. In the embodiment of FIG. 2A, each of a plurality of first metal units of the first metal resonant structure 231 substantially has a square shape. According to practical measurements, if the first metal resonant structure 231 is applied to the flexible wearable layer 110 of the wearable device 100 as mentioned in the previous embodiment, it can also provide similar performance.

Figure 2B:
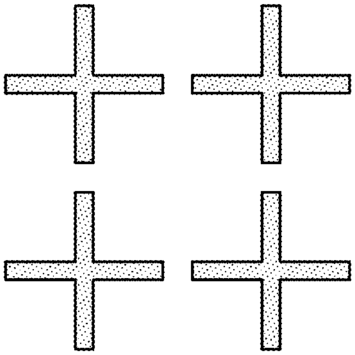
FIG. 2B is a top view of a first metal resonant structure according to an embodiment of the invention.

FIG. 2B is a top view of a first metal resonant structure 232 according to an embodiment of the invention. In the embodiment of FIG. 2B, each of a plurality of first metal units of the first metal resonant structure 232 substantially has a cross shape. According to practical measurements, if the first metal resonant structure 232 is applied to the flexible wearable layer 110 of the wearable device 100 as mentioned in the previous embodiment, it can also provide similar performance.

Figure 2C:
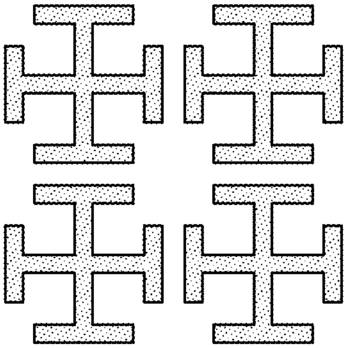
FIG. 2C is a top view of a first metal resonant structure according to an embodiment of the invention.

FIG. 2C is a top view of a first metal resonant structure 233 according to an embodiment of the invention. In the embodiment of FIG. 2C, each of a plurality of first metal units of the first metal resonant structure 233 substantially has an extended cross shape. According to practical measurements, if the first metal resonant structure 233 is applied to the flexible wearable layer 110 of the wearable device 100 as mentioned in the previous embodiment, it can also provide similar performance.

Figure 3A:
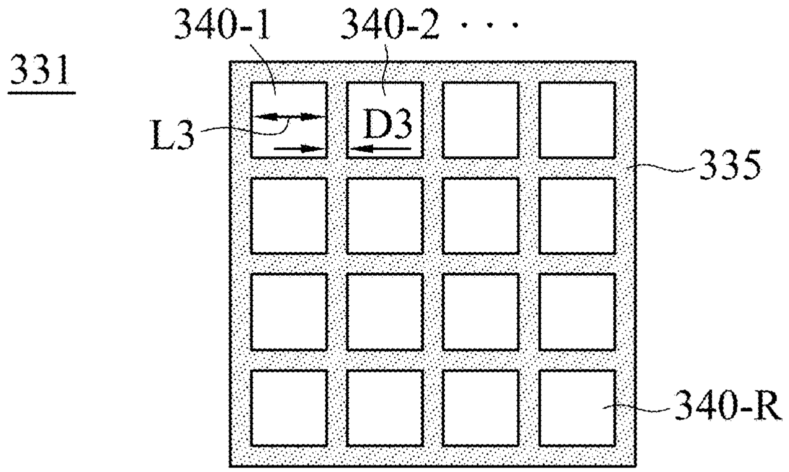
FIG. 3A is a top view of a first metal resonant structure according to an embodiment of the invention.

FIG. 3A is a top view of a first metal resonant structure 331 according to an embodiment of the invention. In the embodiment of FIG. 3A, the first metal resonant structure 331 includes a metal plane 335. Specifically, the metal plane 335 has a plurality of openings 340-1, 340-2, . . . , and 340-R, where "R" is any integer greater than or equal to 4. Each of the openings 340-1, 340-2, . . . , and 340-R may substantially have a square shape. According to practical measurements, if the first metal resonant structure 331 is applied to the flexible wearable layer 110 of the wearable device 100 as mentioned in the previous embodiment, it can also provide similar performance. With respect to the element sizes, in the first metal resonant structure 331, the length L3 of each of the openings 340-1, 340-2, . . . , and 340-R may be from 0.1 to 1 wavelength (λ/10~λ) of the operational frequency band of the wearable device 100. Furthermore, the distance D3 between any adjacent two of the openings 340-1, 340-2, . . . , and 340-R may be shorter than or equal to 0.1 wavelength (λ/10) of the operational frequency band of the wearable device 100. Thus, by using the above design, the wearable device 100's capability of suppressing reflections can be further optimized.

Figure 3B:
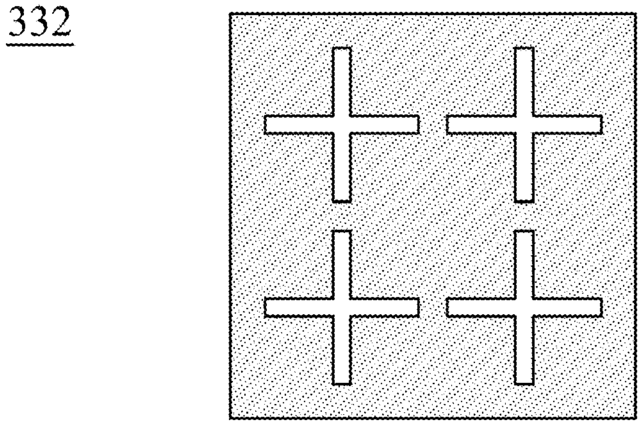
FIG. 3B is a top view of a first metal resonant structure according to an embodiment of the invention.

FIG. 3B is a top view of a first metal resonant structure 332 according to an embodiment of the invention. In the embodiment of FIG. 3B, each of a plurality of openings of a metal plane of the first metal resonant structure 332 substantially has a cross shape. According to practical measurements, if the first metal resonant structure 332 is applied to the flexible wearable layer 110 of the wearable device 100 as mentioned in the previous embodiment, it can also provide similar performance.

Figure 3C:
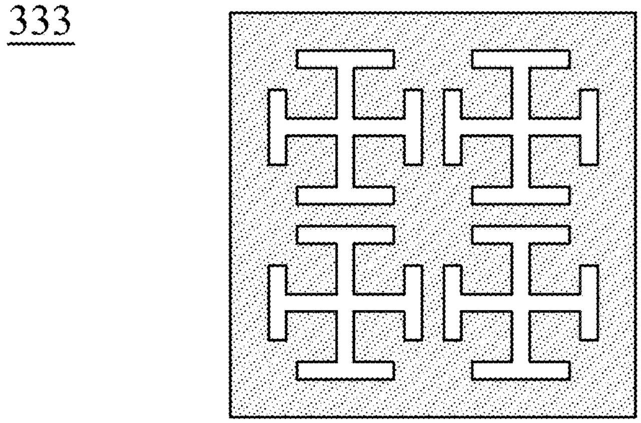
FIG. 3C is a top view of a first metal resonant structure according to an embodiment of the invention.

FIG. 3C is a top view of a first metal resonant structure 333 according to an embodiment of the invention. In the embodiment of FIG. 3C, each of a plurality of openings of a metal plane of the first metal resonant structure 333 substantially has an extended cross shape. According to practical measurements, if the first metal resonant structure 333 is applied to the flexible wearable layer 110 of the wearable device 100 as mentioned in the previous embodiment, it can also provide similar performance.

Figure 4:
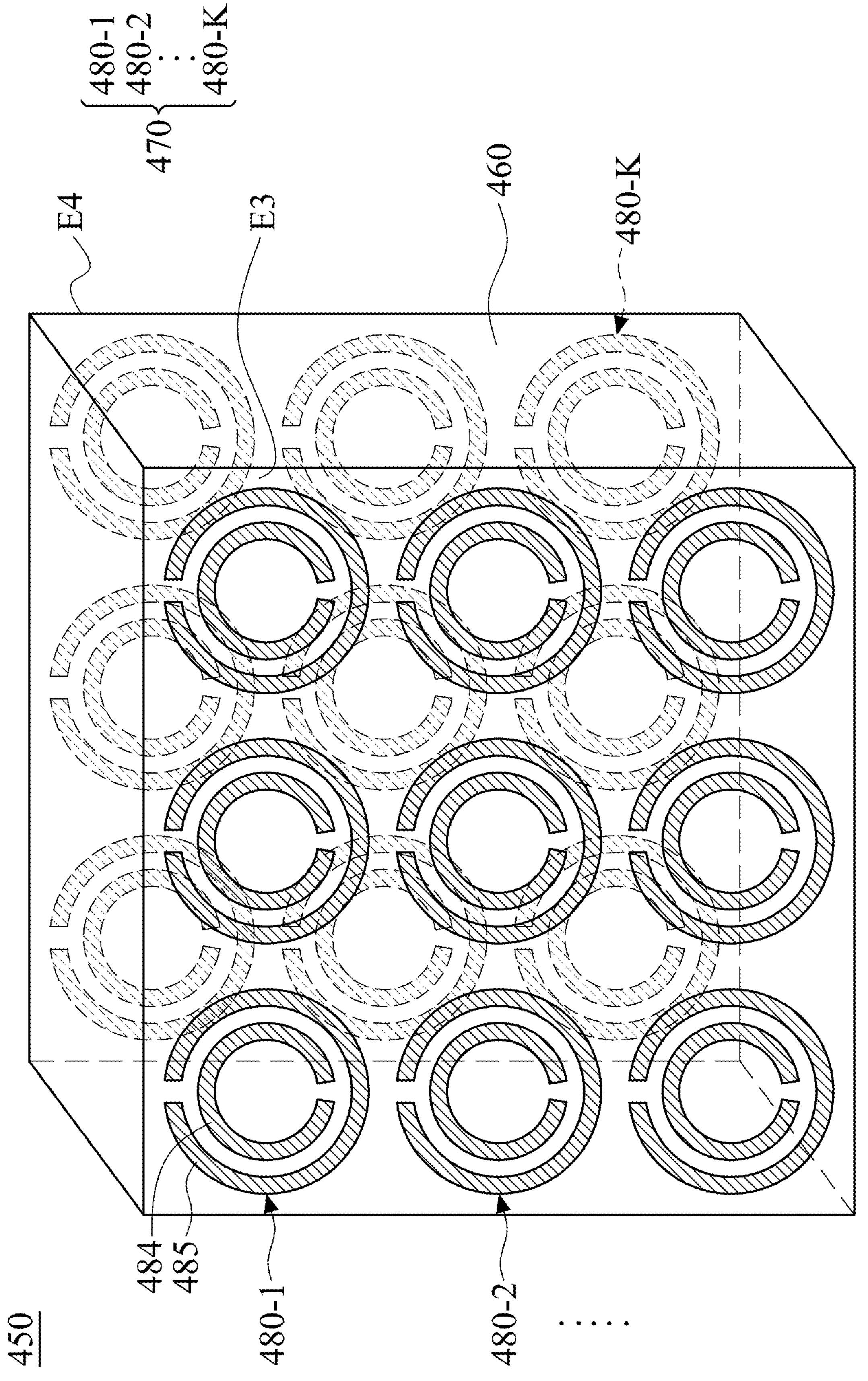
FIG. 4 is a perspective view of a detachable layer according to an embodiment of the invention.

FIG. 4 is a perspective view of a detachable layer 450 according to an embodiment of the invention. In the embodiment of FIG. 4, the detachable layer 450 includes a dielectric substrate 460 and a second metal resonant structure 470. The dielectric substrate 460 has a first surface E3 and a second surface E4 which are opposite to each other. In some embodiments, the second metal resonant structure 470 includes a plurality of second metal units 480-1, 480-2, . . . , and 480-K disposed on both of the first surface E3 and the second surface E4 of the dielectric substrate 460, where "K" is any integer greater than or equal to 2. For example, the second metal units 480-1, 480-2, . . . , and 480-K may all be inductive elements, and they may at least partially overlap each other, so as to increase the transmission efficiency of the RF signal SF. Specifically, each of the second metal units 480-1, 480-2, . . . , and 480-K includes a first C-shaped metal element 484 and a second C-shaped metal element 485 which are separate from and adjacent to each other. The first C-shaped metal element 484 can be substantially surrounded by the second C-shaped metal element 485. According to practical measurements, if the detachable layer 450 is applied to the wearable device 100 as mentioned in the previous embodiment, it can also provide similar performance.

Figure 5:
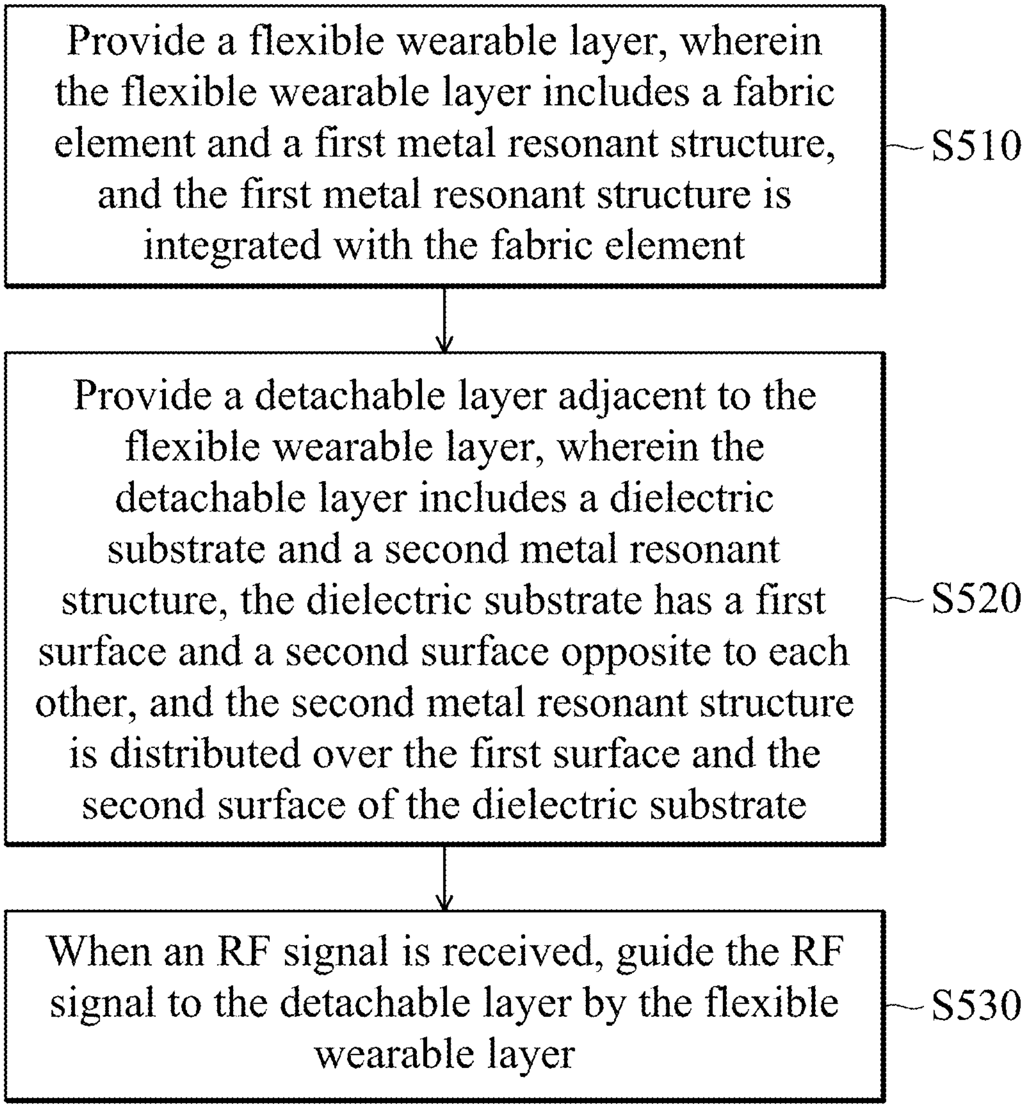
FIG. 5 is a flowchart of a communication method according to an embodiment of the invention.

FIG. 5 is a flowchart of a communication method according to an embodiment of the invention. To begin, in step S510, a flexible wearable layer is provided. The flexible wearable layer includes a fabric element and a first metal resonant structure. The first metal resonant structure is integrated with the fabric element. In step S520, a detachable layer adjacent to the flexible wearable layer is provided. The detachable layer includes a dielectric substrate and a second metal resonant structure. The dielectric substrate has a first surface and a second surface which are opposite to each other. The second metal resonant structure is distributed over the first surface and the second surface of the dielectric substrate. Finally, in step S530, when an RF signal is received, the RF signal is guided to the detachable layer by the flexible wearable layer. It should be understood that these steps are not required to be performed in order, and every feature of the embodiments of FIGS. 1-4 may be applied to the communication method of FIG. 5.

The invention proposes a novel wearable device and a novel communication method. In comparison to the conventional design, the invention has at least the advantages of improving the capability of suppressing non-ideal signal reflections. Therefore, the invention is suitable for application in a variety of devices.

Note that the above element sizes and element parameters are not limitations of the invention. A designer can fine-tune these setting values according to different requirements. It should be understood that the wearable device and the communication method of the invention are not limited to the configurations of FIGS. 1-5. The invention may include any one or more features of any one or more embodiments of FIGS. 1-5. In other words, not all of the features displayed in the figures should be implemented in the wearable device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A wearable device, comprising:

a flexible wearable layer, comprising:

a fabric element; and a first metal resonant structure, integrated with the fabric element; and a detachable layer, disposed adjacent to the flexible wearable layer, and comprising:

a dielectric substrate, having a first surface and a second surface opposite to each other; and a second metal resonant structure, distributed over the first surface and the second surface of the dielectric substrate;

wherein when the wearable device receives an RF (Radio Frequency) signal, the flexible wearable layer guides the RF signal to the detachable layer.

2. The wearable device as claimed in claim 1, wherein the flexible wearable layer causes a Mie scattering event of the RF signal, and a main transmission direction of the Mie scattering event is toward the detachable layer.

3. The wearable device as claimed in claim 1, wherein the wearable device covers an operational frequency band from 2.4 GHz to 100 GHz, and a frequency of the RF signal is within the operational frequency band.

4. The wearable device as claimed in claim 3, wherein the first metal resonant structure comprises:

a plurality of first metal units, distributed over the fabric element, wherein the first metal units are independent of each other.

5. The wearable device as claimed in claim 4, wherein a length of each of the first metal units is from 0.1 to 1 wavelength of the operational frequency band.

6. The wearable device as claimed in claim 4, wherein a distance between any adjacent two of the first metal units is shorter than or equal to 0.1 wavelength of the operational frequency band.

7. The wearable device as claimed in claim 3, wherein a distance between the flexible wearable layer and the detachable layer is shorter than or equal to 0.5 wavelength of the operational frequency band.

8. The wearable device as claimed in claim 3, wherein the second metal resonant structure comprises:

a plurality of second metal units, disposed on the first surface and the second surface of the dielectric substrate, wherein the second metal units are independent of each other.

9. The wearable device as claimed in claim 8, wherein the second metal units are inductive elements.

10. The wearable device as claimed in claim 8, wherein a length of each of the second metal units is shorter than or equal to 0.5 wavelength of the operational frequency band.

11. The wearable device as claimed in claim 8, wherein a distance between any adjacent two of the second metal units is shorter than or equal to 0.1 wavelength of the operational frequency band.

12. The wearable device as claimed in claim 1, wherein the dielectric substrate is implemented with a bulletproof plate.

13. A communication method, comprising the steps of:

providing a flexible wearable layer, wherein the flexible wearable layer comprises a fabric element and a first metal resonant structure, and the first metal resonant structure is integrated with the fabric element;

providing a detachable layer adjacent to the flexible wearable layer, wherein the detachable layer comprises a dielectric substrate and a second metal resonant structure, the dielectric substrate has a first surface and a second surface opposite to each other, and the second metal resonant structure is distributed over the first surface and the second surface of the dielectric substrate; and when an RF signal is received, guiding the RF signal to the detachable layer by the flexible wearable layer.

14. The communication method as claimed in claim 13, further comprising:

causing a Mie scattering event of the RF signal by the flexible wearable layer, wherein a main transmission direction of the Mie scattering event is toward the detachable layer.

15. The communication method as claimed in claim 13, wherein a frequency of the RF signal is within an operational frequency band from 2.4 GHz to 100 GHz.

16. The communication method as claimed in claim 15, wherein a length of each of a plurality of first metal units of the first metal resonant structure is from 0.1 to 1 wavelength of the operational frequency band.

17. The communication method as claimed in claim 15, wherein a distance between any adjacent two of a plurality of first metal units of the first metal resonant structure is shorter than or equal to 0.1 wavelength of the operational frequency band.

18. The communication method as claimed in claim 15, wherein a distance between the flexible wearable layer and the detachable layer is shorter than or equal to 0.5 wavelength of the operational frequency band.

19. The communication method as claimed in claim 15, wherein a length of each of a plurality of second metal units of the second metal resonant structure is shorter than or equal to 0.5 wavelength of the operational frequency band.

20. The communication method as claimed in claim 15, wherein a distance between any adjacent two of a plurality of second metal units of the second metal resonant structure is shorter than or equal to 0.1 wavelength of the operational frequency band.

* * * * *